United States Patent Office 3,484,461
Patented Dec. 16, 1969

3,484,461
PROCESS FOR THE PRODUCTION OF 2,3-DICHLORONAPHTHOQUINONE-(1,4)
Kurt Dannhäuser, Wyhlen, Lorrach, Otto Wiedemann, Grunwald, and Reinhard Leitsmann, Regensburg, Germany, assignors to Chemische Fabrik von Heyden A.G., Munich, Germany, a corporation of Germany
No Drawing. Filed Dec. 20, 1966, Ser. No. 603,156
Claims priority, application Germany, Dec. 21, 1965, C 37,730
Int. Cl. C07c 49/66
U.S. Cl. 260—396                                  10 Claims

ABSTRACT OF THE DISCLOSURE

Process for the production of 2,3-dichloronaphthoquinone-(1,4), a fungicidal and antifungus agent to prevent or stem the formation of mold, mildew and other funguslike colonies or growth, wherein 1,4-naphthoquinone is chlorinated in a single step with molecular chlorine in the presence of a catalyst consisting of an N,N-dialkyl acylamide (especially N,N-dimethyl formamide or N,N-dimethyl acetamide), the chlorination reaction being carried out at a temperature of 80 to 120° C. and in the presence of 0.1 to 2% by weight of the catalyst based upon the quantity of 1.4 naphthoquinone. The reaction medium is an organic solvent stable in the presence of the catalyst and chlorine gas, especially chlorinated aromatic and catenary hydrocarbons such as tetrachloroethane and orthodichlorobenzene. The crystals of 2,3-dichloronaphthoquinone-(1,4) are filtered from the mother liquor which is treated with an additional quantity of the N,N-dialkyl acylamide to produce further quantities of the 2,3-dichloronaphthoquinone-(1,4).

---

Our present invention relates to a process for the production of 2,3-dichloronaphthoquinone-(1,4) and, more particularly, to a single-step economical method of making this product.

2,3-dichloronaphthoquinone-(1,4) has the general-structure formula

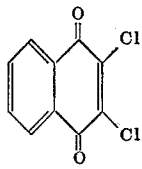

and is a compound known for its fungicidal and/or fungistatic character and has been used generally for preventing the formation of fungus colonies and molds and to prevent the growth of such colonies or the development of mold. The common methods of making 2,3-dichloronaphthoquinone-(1,4) have generally required a succession of at least three steps, including, as the first step, a substitution of hydrogen chloride in the 2–3 position of 1,4-naphthoquinone to form 2,3-dihydrodichloronaphthoquinone-(1,4); in the second step, dihydrochlorination removes one molecule of hydrogen chloride from each molecule of the substituted naphthoquinone to form a 2-chloronaphthoquinone. The third step involves the substitution of chlorine for hydrogen to produce the 2,3-dichloronaphthoquinone.

The second and third steps of the general reaction schemes set forth above require a dehydrochlorination or a chlorination catalyst to effectuate respectively the removal of hydrogen chloride and the substitution of chlorine as indicated. The initial step of the reaction does not, however, require a catalyst and indeed when the reaction is carried out in the presence of ferric chloride ($FeCl_3$), the presence of a catalyst may be detrimental. The use of ferric-chloride reaction systems has the disadvantage, therefore, that the reaction must be subdivided into a plurality of steps to be carried out successively. Another disadvantage is that the reaction medium or mother liquor, upon recovery of the crystals of 2,3-dichloronaphthoquinone-(1,4) therefrom, does not permit of recycling to the reaction or reprocessing without a neutralization or inactivation of the catalyst which otherwise would give rise to side reactions in ferric-chloride systems.

These and other methods of chlorinating 1,4-naphthoquinone to produce the 2,3-dichloronaphthoquinone-(1,4) are described in German Patents Nos. 1,141,632, 1,144,-705 and 1,194,392 and in Austrian Patent No. 190,921. Such systems generally attempt to obviate the disadvantages set forth above by reducing the number of reaction steps. They do not, however, completely solve the problem and it is the principal object of the present invention to provide an improved method of chlorinating 1,4-naphthoquinone to produce 2,3-dichloronaphthoquinone-(1,4) in an economical, convenient, inexpensive and efficient manner.

Another object of the invention is to provide an improved single-step method of chlorinating 1,4-naphthoquinone wherein inactivation or masking of the catalyst can be avoided and the mother liquor efficiently reused.

We have now discovered that N,N-dialkyl acylamides having the general formula

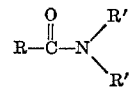

(wherein R is hydrogen or an alkyl group having 1 to 4 carbon atoms and R' is an alkyl group of 1 to 4 carbon atoms) and especially the N,N-dimethyl acylamide (R'=methyl), namely N,N-dimethyl formamide (R=H) and N,N-dimethyl acetamide (R=$CH_3$), are uniquely suitable for use as catalysts of a single stable chlorination of 1,4-naphthoquinone to 2,3-dichloronaphthoquinone-(1,4). It is especially significant that this reaction can be carried out to yield crystals of the product which, upon recovery, leave a mother liquor or filtrate which can be treated directly with further quantities of the catalyst to recover additional portions of 2,3-dichloronaphthoquinone-(1,4); masking or inactivation of the catalyst to present undesirable side reaction is avoided and repeated reuse or recycling of the mother liquor successfully ensured.

According to a further feature of this invention, the reaction is carried out in a single process step by reacting the 1,4-naphthoquinone with molecular chlorine in an organic solvent or reaction medium stable under the chlorinating conditions set forth and changing insignificantly, if at all, in the course of the reaction process. We have found that a suitable solvent should be a chlorinated aromatic or aliphatic compound having 6 carbon atoms or less and preferably a boiling point under the reaction conditions above the preferred reaction temperature of 80 to 120° C. The solvent most desirable is tetrachloroethane or orthodichlorobenzene. The temperature can be held at the preferred value of 95° C. by supplementary heating of the reaction mixture although the chlorination reaction is exothermic at least initially and such heating is not always required. The dialkyl acylamide catalyst, preferably N,N-dimethyl formamide or N,N-dimethyl acetamide, is incorporated in the reaction system in an amount ranging from 0.1 to 2.0% by weight of the quantity of 1,4-naphthoquinone.

Not only has the present process proved to be advantageous because it permits of reuse of the mother liquor and substantially complete recovery of the 1,4-naphthoquinone as 2,3 - dichloronaphthoquinone - (1,4), but the process is of relatively low cost in that moist or technical grade 1,4-naphthoquinone—as obtained for example as a by-product of the production of phthalic anhydride—can be used. The single-step reaction, moreover, obviates the need for complex temperature controls and greatly simplifies the supervision or regulation of the reaction conditions and progress. Furthermore, the mother liquor can be reused without a distillation or clarification treatment while the product is recovered without contamination by metal halides.

The following examples are illustrative of the method of the present invention.

EXAMPLE I

A heatable reactor with agitator, thermometer, condenser cooler (e.g. reflux condenser) and supply pipe and outlet pipe for the gases is filled with 32 liters of tetrachlorethane. While stirring, 9 kg. of 1,4-naphthoquinone is introduced; then 90 ml. of N,N-dimethyl formamide is added and chlorine admitted at a rate of about 1.8 kg./hr., whereby the temperature rises to approx. 80° C. to 95° C. When the temperature becomes constant, after about 2 hours, heating is commenced and the reaction mixture maintained at 95° C. until the end of the reaction (4 to 5 hours), perceptible by a faint evolution of HCl and the development of free chlorine in the reactor. For a short time air is blown through the reaction mixture in order to remove $Cl_2$ and HCl; the mixture is then put into a suitable vessel and, with stirring, cooled overnight. The raw product is sharply drawn off and turbinated in 12 liters of methanol. After decanting and drying, the product is obtained in golden to orange-yellow needles.

Yield of 2,3-dichloronaphthoquinone-(1,4)=10.34 kg.; yield=80% of theoretical. Melting point=195.5° C.

The resulting tetrachlorethane mother liquor (about 29 liters) is treated with 3 liters of fresh tetrachlorethane and 10 ml. of N,N-dimethyl formamide. The process is repeated another 5 times with the thus regenerated reaction medium. The total yield of the deposits 1–6 is then 94% (of theoretical), of 2,3 - dichloronaphthoquinone-(1,4) based on the 1,4 - naphthoquinone-(1,4) used. The melting point of the 2,3-dichloronaphthoquinone-(1,4) obtained by reutilization of the mother liquor is 194° to 195° C.

EXAMPLE II 9 kg. of 1,4-naphthoquinone is chlorinated and worked up under the same conditions as described in Example I, with, however, the use of 90 ml. of N,N-dimethyl acetamide as the catalyst instead of N,N-dimethyl formamide.

Yield of 2,3-dichloronaphthoquinone-(1,4)=10.6 kg.; yield=82% of theoretical. Melting point=195.5° C.

EXAMPLE III

The apparatus described in Example I, filled with 48 liters of o-dichlorobenzene, is charged while stirring with 13.8 kg. of moist technical-grade 1,4-naphthoquinone (content of naphthoquinone=64.8% by dry weight); subsequently 14 liters of water is added. With vigorous stirring and the blowing of air through the mixture both phases are intimately mixed. Then the aqueous solution is separated and the organic phase is treated with 138 ml. of N,N-dimethyl acetamide, chlorinated and worked up as described in Example I.

Yield of 2,3-dichloronaphthoquinone-(1,4)=10.2 kg.; yield=79% of theoretical. Melting point=194.5° C.

The o-dichlorobenzene mother liquor (about 43 liters) is treated with 5 liters of fresh o-dichlorobenzene. The process is repeated another 15 times with the thus regenerated reaction medium whereby each addition of 138 ml. of N,N-dimethyl acetamide occurs only after the separation of the respective phase.

The total yield of the recovery step 1 to 16 amounts then to 96% (of theoretical) of 2,3-dichloronophthoquinone-(1,4 based on the naphthoquinone used. The melting point of the 2,3-dichloronaphthoquinone-(1,4 obtained through treatment of the mother liquors is 194° C.

We claim:

1. A process for the production of 2,3-dichloronaphthoquinone-(1,4) comprising the step of chlorinating 1,4-naphthoquinone in an organic solvent with molecular chlorine in the presence of an N,N-dialkyl acylamide catalyst having the general formula

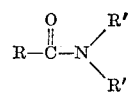

wherein R is hydrogen or an alkyl group having 1 to 4 carbon atoms and R' is an alkyl group of 1 to 4 carbon atoms; and thereafter recovering the resulting 2,3-dichloronaphthoquinone-(1,4) from said solvent.

2. The process defined in claim 1 wherein crystals of 2,3-dichloronaphthoquinone-(1,4) are separated from said solvent to form from the partially depleted solvent a mother liquor, said process further comprising the step of treating said mother liquor with an additional quantity of said catalyst to form a further quantity of 2,3-dichloronaphthoquinone-(1,4).

3. The process defined in claim 2 wherein said solvent is a chlorinated aromatic or aliphatic compound.

4. The process defined in claim 3 wherein said solvent is tetrachloroethane or dichlorobenzene.

5. The process defined in claim 1 wherein said catalyst is an N,N-dimethyl acylamide.

6. The process defined in claim 5 wherein said catalyst is N,N-dimethyl formamide or N,N-dimethyl acetamide.

7. The process defined in claim 1 wherein said catalyst is added to said solvent in an amount ranging between substantially 0.1 to 2% by weight of the 1,4-naphthoquinone.

8. The process defined in claim 1 wherein chlorination of said 1,4-naphthoquinone is carried out in a single step at a reaction temperature of substantially 80° to 120° C.

9. The process defined in claim 1 wherein said catalyst is N,N-dimethyl formamide or N,N-dimethyl acetamide and is present in an amount ranging between 0.1 and 2% by weight of the 1,4-naphthoquinone, the chlorination reaction is carried out at a temperature between about 80° and 120° C., said solvent is tetrachloroethane or orthodichlorobenzene, said 2,3-dichloronaphthoquinone-(1,4) is recovered from said solvent by crystallization of the 2,3-dichloronaphthoquinone-(1,4) and filtration of crystals thereof from the resulting mother liquor.

10. The process defined in claim 9, further comprising treating the mother liquor with additional quantities of the catalyst to recover further quantities of 2,3-dichloronaphthoquinone-(1,4).

References Cited

UNITED STATES PATENTS 2,975,196  3/1961  Lennart _____ 260—396

LORRAINE A. WEINBERGER, Primary Examiner

L. ARNOLD THAXTON, Assistant Examiner

U.S. Cl. X.R.

260—999